(12) United States Patent
Zhang et al.

(10) Patent No.: US 12,049,040 B2
(45) Date of Patent: Jul. 30, 2024

(54) 3D PRINTING ON MEMBRANE OF FILTRATION DEVICE

(71) Applicant: Khalifa University of Science and Technology, Abu Dhabi (AE)

(72) Inventors: Tiejun Zhang, Abu Dhabi (AE); Faisal Al Marzooqi, Abu Dhabi (AE); Hongxia Li, Abu Dhabi (AE); Aikifa Raza, Abu Dhabi (AE); Afra Saeed Alketbi, Abu Dhabi (AE); Abdulrahman Outhman Kharbatli, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 17/870,682

(22) Filed: Jul. 21, 2022

(65) Prior Publication Data
US 2023/0030684 A1 Feb. 2, 2023

Related U.S. Application Data

(60) Provisional application No. 63/226,291, filed on Jul. 28, 2021.

(51) Int. Cl.
*B29C 64/124* (2017.01)
*B01D 67/00* (2006.01)
(Continued)

(52) U.S. Cl.
CPC ...... *B29C 64/124* (2017.08); *B01D 67/00933* (2022.08); *B01D 71/022* (2013.01);
(Continued)

(58) Field of Classification Search
CPC ............ B29C 64/124; B01D 67/00933; B01D 71/022; B01D 71/06; B01D 67/00415;
(Continued)

(56) References Cited

U.S. PATENT DOCUMENTS

| 10,364,504 B2* | 7/2019 | Sun ..................... B01D 69/1216 |
| 2016/0200891 A1* | 7/2016 | Virgilio ................ B01D 71/027 424/492 |

(Continued)

FOREIGN PATENT DOCUMENTS

CN 105848812 A * 8/2016 ............ B22F 3/1055

OTHER PUBLICATIONS

R. Da Costa, A.G. Fane, D.E. Wiley, Spacer characterization and pressure drop modelling in spacer-filled channels for ultrafiltration, J. Memb. Sci., 87 (1) (1994).
(Continued)

*Primary Examiner* — Nahida Sultana
(74) *Attorney, Agent, or Firm* — Kilpatrick Townsend & Stockton LLP

(57) ABSTRACT

Three-dimensional printing on a membrane of a filtration device is described herein. Forming the filtration device involves receiving a membrane comprising a porous material, depositing an ink into pores of the porous material, causing the ink to solidify, and continuously building three-dimensional printed structures via micro-stereolithographic three-dimensional printing. Solidifying the ink causes the ink to bond with the membrane.

15 Claims, 15 Drawing Sheets

(51) Int. Cl.
*B01D 71/02* (2006.01)
*B01D 71/06* (2006.01)
*B33Y 10/00* (2015.01)
*B33Y 40/20* (2020.01)
*B29L 31/00* (2006.01)
*B33Y 80/00* (2015.01)

(52) U.S. Cl.
CPC .............. *B01D 71/06* (2013.01); *B33Y 10/00* (2014.12); *B33Y 40/20* (2020.01); *B29L 2031/755* (2013.01); *B33Y 80/00* (2014.12)

(58) Field of Classification Search
CPC .......... B01D 67/00045; B01D 67/0088; B01D 67/009; B01D 69/106; B01D 69/141; B01D 2323/46; B01D 2325/08; B33Y 10/00; B33Y 40/20; B33Y 80/00; B29L 2031/755; Y02A 20/131
See application file for complete search history.

(56) References Cited

U.S. PATENT DOCUMENTS

2020/0061709 A1\* 2/2020 Cousineau ........... B23K 10/027
2020/0237568 A1\* 7/2020 Tarajano ............... A61L 15/425

OTHER PUBLICATIONS

Y.C. Woo, Y. Kim, M. Yao, L.D. Tijing, J.-S. Choi, S. Lee, S.-H. Kim, H.K. Shon, Hierarchical composite membranes with robust omniphobic surface using layer-by-layer assembly technique, Environ. Sci. Technol., 52 (4) (2018).

M. Yao, J. Ren, N. Akther, Y.C. Woo, L.D. Tijing, S.-H. Kim, H.K. Shon, Improving membrane distillation performance: morphology optimization of hollow fiber membranes with selected non-solvent in dope solution, Chemosphere, 230 (2019).

L.D. Tijing, J.-S. Choi, S. Lee, S.-H. Kim, H.K. Shon, Recent progress of membrane distillation using electrospun nanofibrous membrane, J. Memb. Sci., 453 (2014).

Y.Z. Tan, Z. Mao, Y. Zhang, W.S. Tan, T.H. Chong, B. Wu, J.W. Chew, Enhancing fouling mitigation of submerged flat-sheet membranes by vibrating 3D-spacers, Sep. Purif. Technol., 215 (2019).

J.-Y. Lee, W.S. Tan, J. An, C.K. Chua, C.Y. Tang, A.G. Fane, T.H. Chong, The potential to enhance membrane module design with 3D printing technology, J. Memb. Sci., 499 (2016).

N. Yanar, M. Son, H. Park, H. Choi, Toward greener membranes with 3D printing technology, Environmental Engineering Research, 26(2) (2021).

\* cited by examiner

3D PRINTING ON MEMBRANE OF FILTRATION DEVICE

CROSS-REFERENCES TO RELATED APPLICATIONS

This application claims the benefit of U.S. Provisional Application No. 63/226,291 filed Jul. 28, 2021, the entire contents of which are hereby incorporated for all purposes in their entirety.

BACKGROUND OF THE INVENTION

Filtration, for example membrane filtration, plays an important role in generating a clean water supply because of its widespread utilization in oily water treatment, brine treatment, water purification, desalination, and wastewater treatment. In the filtration process, purified water passes through the membrane, whereas the oil droplets, plastic micro-particles, and solutes are rejected by the membrane. In many water applications, membrane filtration offers several advantages, including higher quality permeate, lower space footprint, modularity, more straightforward automation, no need for extraneous chemicals, and therefore reduced waste and lower energy cost.

Despite all these advantages, membrane fouling is still a major problem that hinders their more widespread and large-scale applications, particularly in wastewater treatment. Most anti-fouling and clogging approaches have been focused on chemical methods such as membrane material development or surface chemistry modification. But with the rising environmental concerns, the non-chemical methods such as membrane topography/patterning becomes in favor of membrane fouling mitigation by manipulating local hydrodynamics.

In oily wastewater, the oil phase in wastewater can exist in three forms, classified based on the size of the oil droplets, namely, free oil (>150 μm), dispersed oil (20-150 μm), and emulsified oil (<20 μm). Membrane filtration can be used for separating oil droplets smaller than ~10 μm from stable oil/water emulsion and can produce a better outcome compared to conventional technologies such as air flotation, gravity separation, oil-absorbing materials, coagulation and flocculation. Given that membrane-based separation is most effective for small oil droplet size or pollutant particles, ultrafiltration (UF) and microfiltration (MF) are the more relevant choices, while osmosis (RO) and nanofiltration (NF) are often used in membrane desalination. If the wastewater is saline and desalination is an accompanying treatment goal, employing RO and NF can also allow for a single-step processing of such waste water.

In water filtration, membranes can be used independently and can additionally or alternatively be combined with other supportive/functional parts into a complete filtration module. The common module designs are flat sheet, spiral wound, tubular, capillary, and hollow fiber, with flat sheet and tubular being more popular. In membrane desalination, a filtration module is usually assembled with one or more membranes and one or more feed spacers. A spacer is placed between membranes to distribute the feed uniformly over the membrane surface.

Conventional membrane filters are usually manufactured as flat sheet and then formed into several different types of membrane modules. Module construction typically involves potting or sealing the membrane material into an assembly, such as a spiral-wound module [1]. The basic unit consists of two membrane sheets placed back to back and separated by a spacer. Majority of the membranes used are made of polymers but ceramic membranes are also utilized. Conventional polymeric membrane fabrication techniques include phase inversion [2], hollow fiber spinning [3], stretching, and extrusion. An increasing number of studies have also focused on the electrospinning technique for various desalination and water treatment applications [4]. In the membrane module, spacer design is also important for high efficient water filtration performance. Different spacer designs with various characteristics have been evaluated in terms of mass transfer, pressure drop, and anti-fouling performance [5]. However, a good spacer with a complex design and geometry can pose manufacturing challenges when using conventional techniques such as heat extrusion, molding or vacuum foaming.

In recent years, AM (3D printing) has provided remarkable advancements in fabricating different parts of membrane modules, e.g., the supportive parts like feed spacer for membrane distillation. Particularly, 3D printing spacers attracts attention. It is primarily owed to the suitable printable resolution in current 3D printers, wherein complex designs can easily be fabricated. Most tests on 3D-printed spacers indicate better performance in terms of flux performance, control of fouling, and even improving hydrodynamic flow compared to commercially available spacers [6].

However, the printing resolution of most commercial 3D printers is not high enough to accurately print the pore sizes of a membrane [7]. Most available 3D printers cannot yet efficiently print with submicron resolution, where membrane pores are usually in that range. Though two photon polymerization systems can achieve sub-micron printing resolution, they are still limited to the small device fabrication size and dimension accuracy [8]. Also, many membranes require far smaller pore sizes such as those for ultrafiltration, nanofiltration and reverse osmosis. Therefore, a combination of conventionally-fabricated nanoporous membrane and micro-3D-printed supportive parts would be attractive for membrane fabrication for desalination and membrane separation processes.

Despite the aforementioned limitations, the 3D printing is currently used in fabricating individual parts and a complete membrane device still relies on assembling. The assembling process, the other way round, also limits the design flexibility of each functional parts while causing fluid leaks potentially during filtration.

BRIEF SUMMARY OF THE INVENTION

In an embodiment, a method can involve receiving a membrane comprising a porous material comprising pores, depositing an ink in a liquid state into the pores of the porous material, and causing the ink to solidify. Solidifying the ink causes the ink to bond with the membrane and form a three-dimensional structure via layer-by-layer three-dimensional printing. Causing the ink to solidify can involve curing the ink using light. Causing the ink to solidify can cause the ink to form functional structures on a surface of the membrane via micro-stereolithographic three-dimensional printing. The functional structures can include three-dimensionally printed lattice structures or three-dimensionally printed bio-mimicked structures. The method can further involve receiving a second porous material between the membrane and the three-dimensional structure and causing the ink to solidify to form additional layers on top of the membrane. The membrane can have a first geometric shape and the three-dimensional structure can have a second geometric shape. The membrane may be a polymeric material, a metallic material, or a ceramic material. The ink can be a photo-curable material and a composite material, which may be a polymeric resin, a hydrogel, or a ceramic nanoparticle ink composite.

In an embodiment, a method for generating a membrane filtration device involves receiving a membrane comprising a porous material comprising pores, depositing an ink into the pores of the porous material, and causing the ink to solidify. Solidifying the ink causes the ink to bond with the membrane and form three-dimensional printed structures. The method further involves inserting a mesh between the three-dimensional printed structures.

BRIEF DESCRIPTION OF THE DRAWINGS

Various embodiments in accordance with the present disclosure will be described with reference to the drawings, in which.

DETAILED DESCRIPTION OF THE INVENTION

Embodiments and techniques described herein are directed to, among other things, filtration membranes. In various embodiments, complex three-dimensional (3D) structures can be directly printed on a porous membrane to form assemble-free all-in-one filtration devices. The membrane materials can be or include polymeric or metallic material, with pore size ranging from nanometer ranges to micrometer ranges. The choices of 3D printing ink include polymer, hydrogel, and ceramic.

In various embodiments described herein, a membrane filtration device is described that includes a printing-on-membrane approach to fabricate a 3D-structured all-in-one membrane which can be used with the filtration device. The printing-on-membrane approach involves a cross-scale multi-material filter manufacturing approach by direct 3D printing-on-membrane without assembling. Additive fabrication of bio-mimicked microstructures, integrating with metallic micromesh and polymeric membrane, enables the creation of multi-functional filtration devices with heterogeneous physicochemical properties. By conducting the filtration benchmarks for surfactant-stabilized emulsion and plastic micro-particles, the 3D-structured hybrid membrane devices are able to demonstrate high permeate flux and filtration durability.

Figure 1:
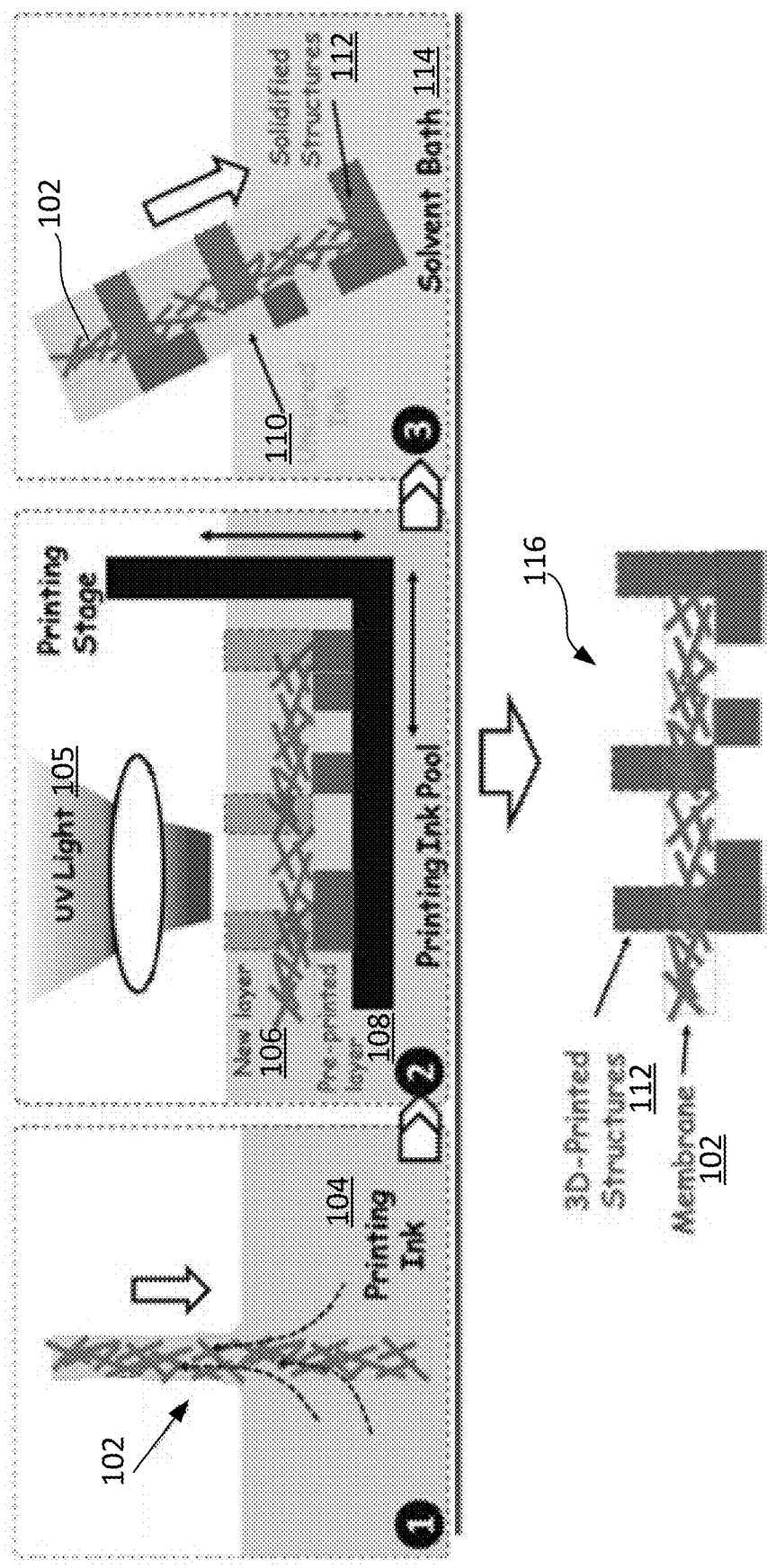
FIG. 1 illustrates an example of a three-dimensional (3D) printing-on-membrane method for the fabrication of 3D-structured membrane filter.

Turning to FIG. 1, the schematic diagrams illustrate a printing-on-membrane technique for creating a 3D-structured hybrid filtration membrane. A micro-stereolithography (μ-SL) 3D printing system can be used to build complex micro-structures through a photo-polymerization process. Before printing, a porous membrane 102 can be submerged in printing ink 104, which can be a liquid. Submerging the porous membrane 102 can allow some or all of the pores of the membrane 102 to be filled with the printing ink 104. In some embodiments, the membrane 102 may be a commercially-available membrane with pore sizes —200. The ink-saturated membrane can be used before the printing as a substrate, or can be embedded between printed layers during the printing. With the intrinsic layer-by-layer printing process of the μ-SL system, a newly printed layer 106 with the membrane 102 saturated in the printing ink 104 can be built on a previously-printed layer 108 (see FIG. 1, Step 2). In further embodiments, the printing time of this membrane-embedded layer can be prolonged depending on the thickness and porosity of membrane material, for example, to allow the printing ink 104 to be sufficiently cured both inside pores and underneath the membrane 102. An ultraviolet (UV) light 105 can be shown on the new layer 106 to cure portions of the printing ink 104. Uncured ink 110 can then be washed away with a solvent bath 114 (see FIG. 1, Step 3), while the solidified structures 112 are kept on the membrane 102, forming a 3D-structured hybrid membrane 116. The solidified structures 112 can be a spacer. The whole process is simple and highly efficient by avoiding extra assembling work.

The printing-on-membrane method has vast material choices in both membrane and printing ink. Different membranes, for example membranes including porous materials, can be used. For example, the membrane 202 can be or include polymeric material, metallic material, ceramic material, and/or any suitable material which has porous structures. The printing ink materials can be photo-curable materials and composite materials. Examples of the composite materials include polymeric resins, hydrogels, and ceramic nanoparticle ink composites.

Figure 2A:
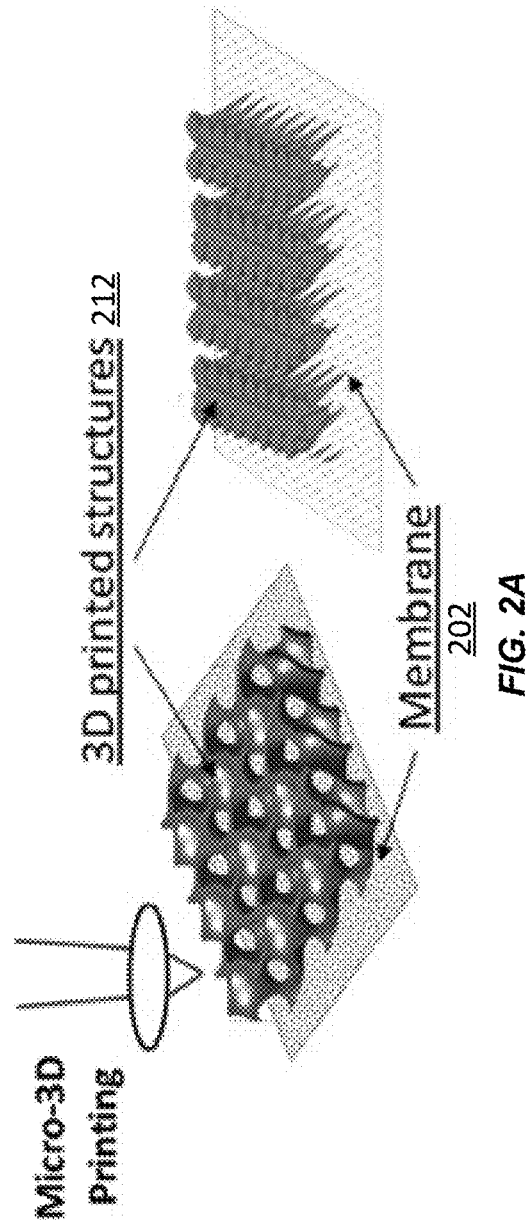
FIGS. 2A and 2B illustrate different approaches of integrating multi-materials and functional parts via a printing-on-membrane technique.
Figure 2B:
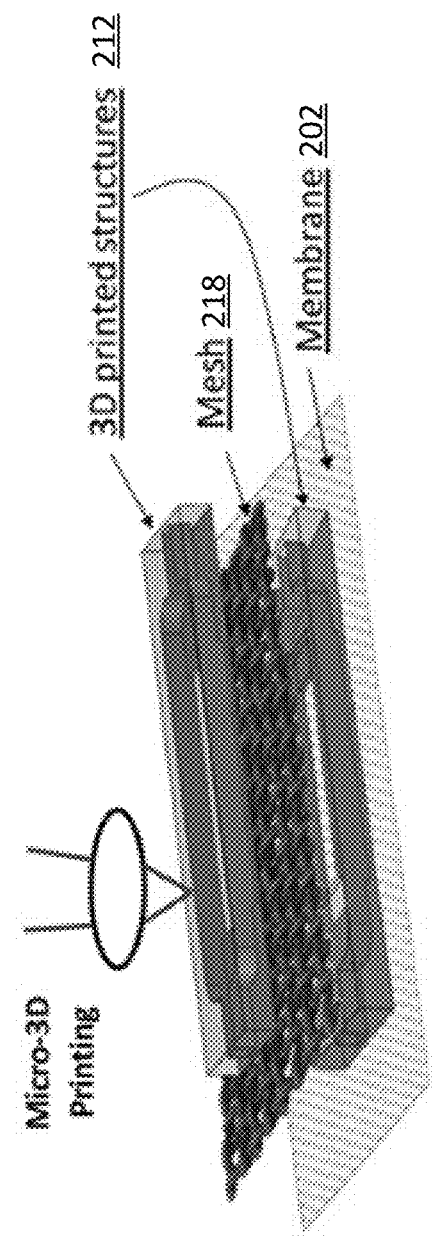

The printing-on-membrane technology is able to additively fabricate 3D structures on a porous membrane to integrate the newly-printed objects with existing functional parts effectively. FIGS. 2A and 2B illustrate different ways of integrating multi-materials and functional parts via printing-on-membrane. In FIG. 2A, the functional structures can be built on or underneath the membrane 202, while in FIG. 2B the printed structures 212 are between two membrane layers forming a multi-layered filtration device. One membrane layer is the membrane 202 and another membrane layer is a mesh 218. The mesh 218 can be a polymeric material, a metallic material, or a ceramic material. The one-step fabrication can reduce or eliminate assembling procedures. The one-step fabrication can be more time-efficient in comparison with conventional fabrication-then-assembling method.

Printing-on-membrane also enables great flexibility in designing and fabricating 3D structures, particularly complex bio-mimicked structures and heterogeneous discrete structures. For instance, in membrane desalination, a traditional spacer has to be a whole piece of sheet, with all the repeatable units connected with each other. Embodiments of the present disclosure involve repeatable units that can be separated from each other as stand-alone elements since the spacer is directly printed on the membrane 202. For example, the repeatable units may be pillars, cones, pyramids, or disconnected cubic structures.

Figure 3A:
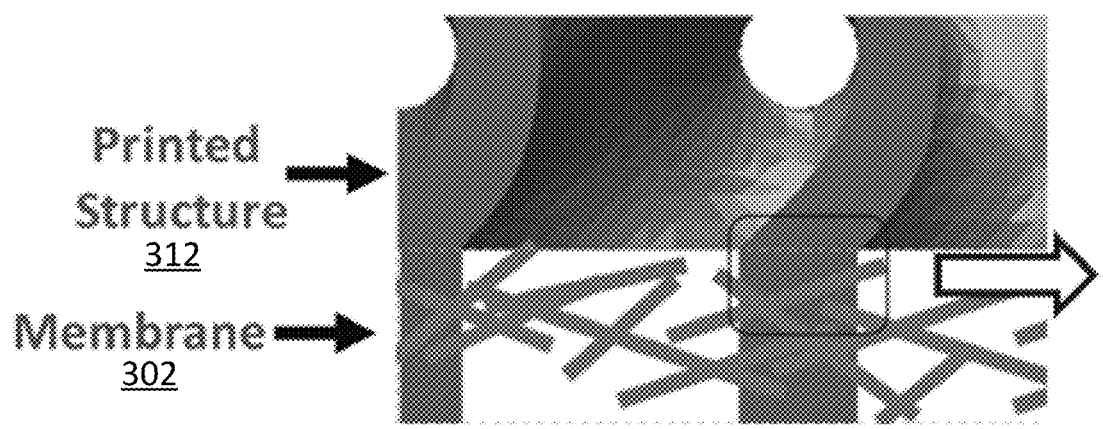
FIGS. 3A and 3B illustrate strong bonding and self-sealing properties enabled by direct 3D printing on membrane.
Figure 3B:
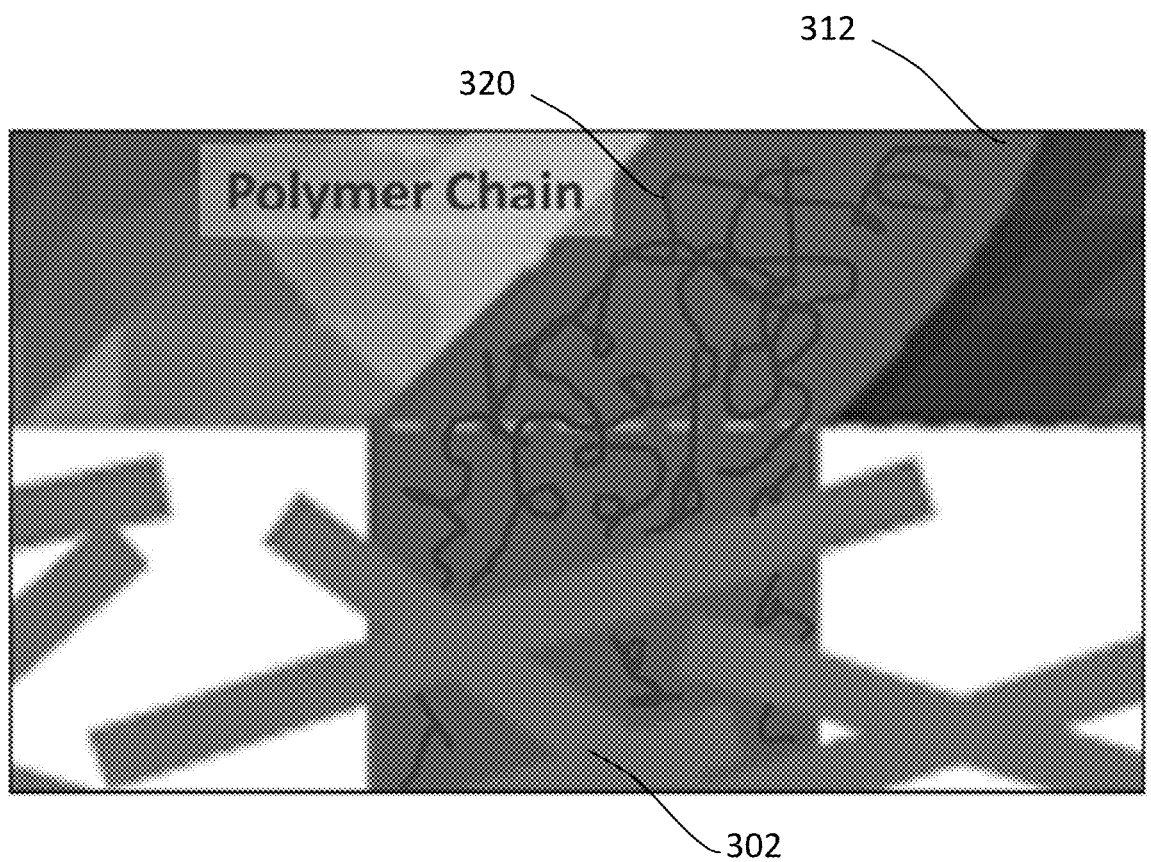

The printing-on-membrane technology can also facilitate strong bonding and self-sealing between 3D-printed structures 312 with the membrane 302. FIG. 3A illustrates a printing process starting from a surface of the membrane 302. Polymerization occurs inside pore space of the membrane 302 owing to the light penetration. Therefore, after solidification, polymer chains 320 are able to spontaneously cross-link the printed structure 312 with the membrane 302 (illustrated in FIG. 3B), resulting in strong chemical bonding and self-sealing properties. The strong adhesion brings great benefits by avoiding membrane delamination and water leakage.

Further, the printing-on-membrane technology can allow for device-level heterogeneous physico-chemical properties. The enhanced and unique attachment between the membrane 302 and the 3D-printed structure 312 through this novel technique creates the potential and opportunity to have continuity and discontinuity of physico-chemical properties within devices. In some applications, the performance is enhanced if some physico-chemical properties of the membrane 302 and the spacer/mesh/gas diffusion layer match each other. In membrane distillation the membrane 302 should be hydrophobic with low thermal conductivity while the spacer should have high thermal conductivity. While in some battery applications, it is desirable to reduce the overall stack electrical resistance, henceforth the mesh and membranes should have low electrical resistance, i.e. matching physico-chemical properties. With this versatile technique, the 3D printed materials, once embedded and attached to the membrane 302 and/or spacer, can be used to obtain heterogeneous physico-chemical properties within the membrane/space structure and tailor them flexibly as required.

Printing-on-membrane, by smart designing the geometry and materials, can ultimately enhance filtration performance or bring new functionalities with optimized geometrical design, such as anti-fouling, anti-clogging, anti-corrosive and anti-scaling properties for water treatment and desalination applications. For example, the membrane 302 may have a first geometric shape (e.g., rectangular), while the printed structures have a second geometric shape (e.g., Primitive or Gyroid lattice structures). By creating the Primitive or Gyroid lattice structures on a surface of the membrane 302, the water convection above the surface of the membrane 302 is enhanced to mitigate mineral scaling during water desalination. The concept of using 3D-printed biomimetic structures on the surface to manipulate the flow field and correspondingly to reduce contaminant or foulant deposition on the surface can also be demonstrated. Besides creating new printed structures 312 on the membrane 302, other materials can be integrated, for example metallic mesh with the membrane 302 via 3D printing. For instance, by integrating a $TiO_2$-coated/covered mesh with the membrane 302 via 3D printing, intrinsic photocatalytic degradation of $TiO_2$ can be taken advantage of for the anti-fouling purpose.

Figure 4:
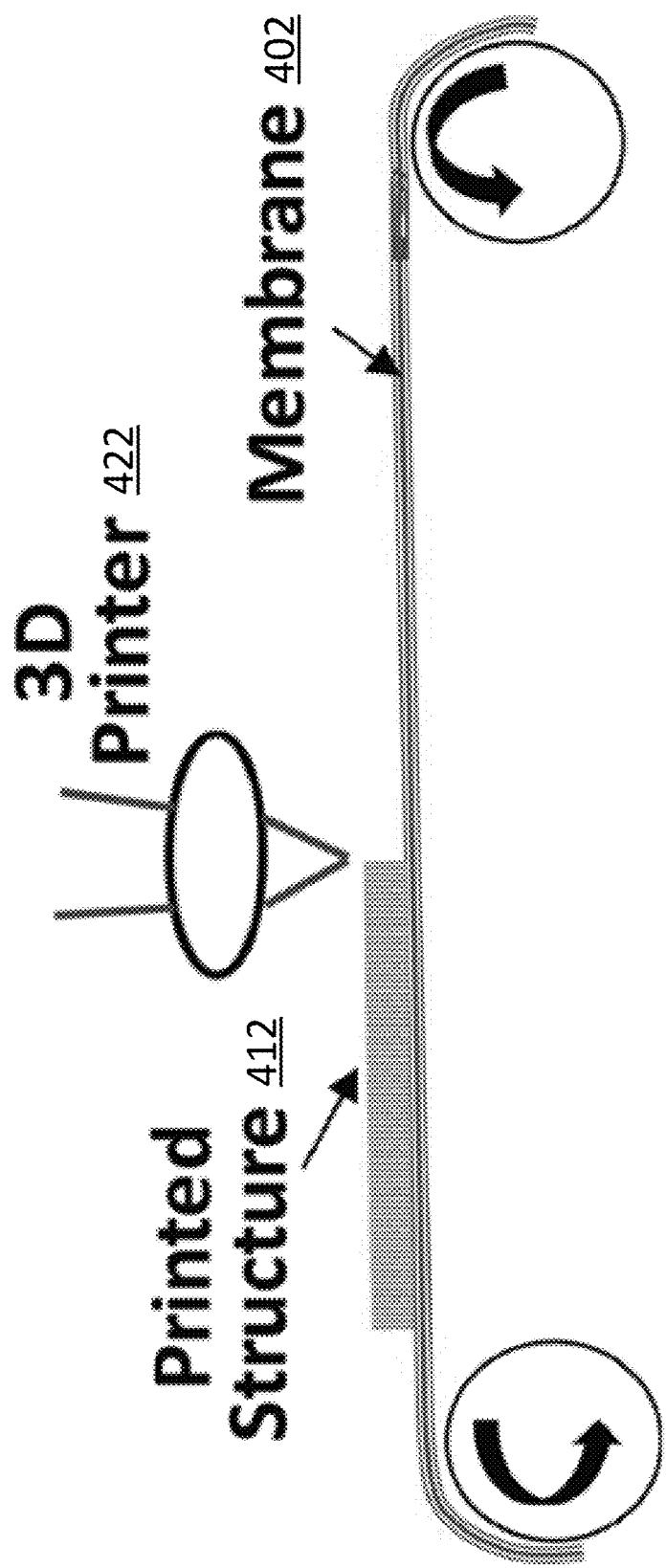
FIG. 4 illustrates an example of a scalable fabrication of 3D-structured hybrid filtration membrane.

The printing-on-membrane device is configurable, modulable and scalable. Benefitting from the advantages of 3D printing, different functional parts can be designed and printed with different structures, but with standard parallel connections to increase permeate flux. The printing can also be scalable on the membrane surface, as illustrated in FIG. 4. A 3D printer 422 can deposit a printed structure 412 to a membrane 402 as the membrane 402 is moved. By transferring the membrane 402 and accurate position control, a large printed area can be achieved though layer-by-layer printing. These building blocks can be combined as a whole or even be rearranged to fit for different operational conditions and application scenarios.

Figure 5A:
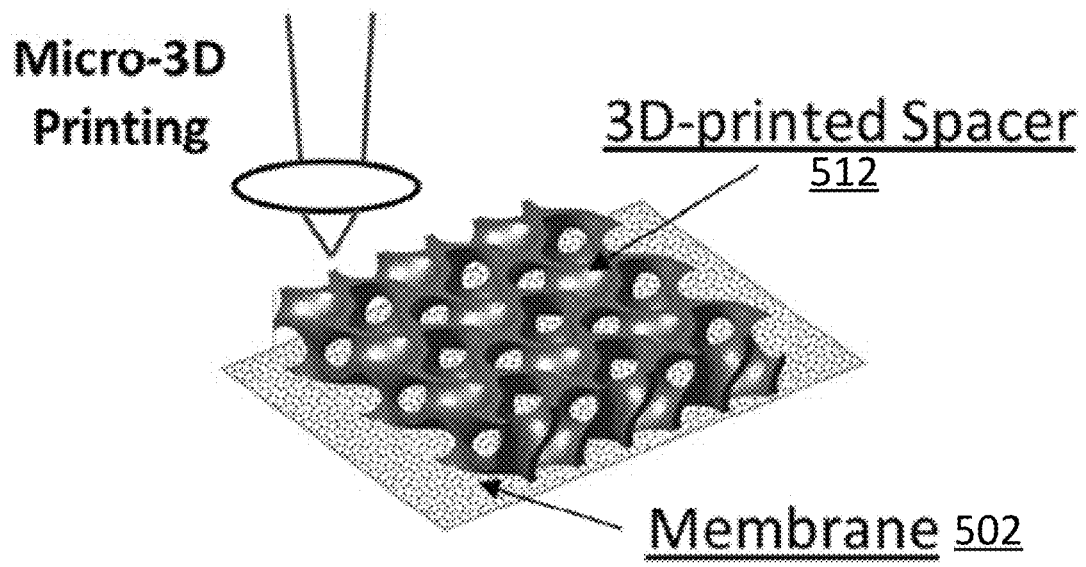
FIGS. 5A and 5B illustrate exemplary fabrication of spacer-on-membrane for water desalination.
Figure 5B:
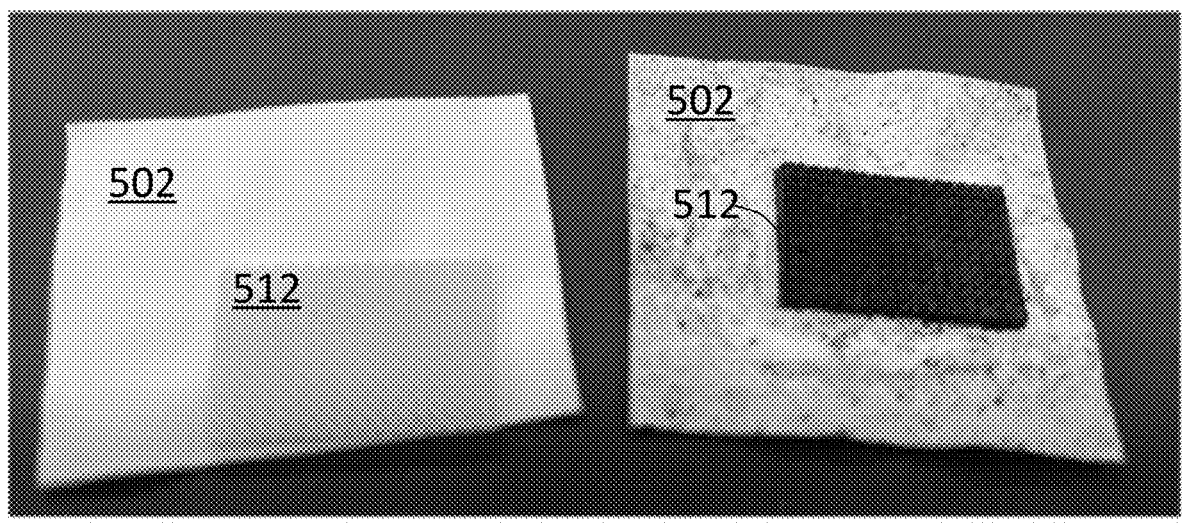

In particular embodiments, a membrane 502 can include a spacer-integrated membrane FIGS. 5A and 5B. As an example, a spacer 512 with Gyroid lattice can be directly printed on a surface of the membrane 502 to demonstrate the implementation of printing-on-membrane technique in desalination applications. As shown in FIG. 5A, by creating the Primitive or Gyroid lattice structures on the surface of the membrane 502, water convection above the membrane 502 can potentially mitigate mineral scaling during water desalination. In FIG. 5B, sunlight absorbing coating materials may be added to the spacer-on-membrane to further functionalize the spacer-on-membrane. These 3D-structured and functionalized membranes can be used for the sustainable solar thermal desalination and wastewater treatment.

In embodiments, the surface microstructures can be optimized. Recent advances in 3D printing bring more flexibility in creating complex microstructures, particularly in mimicking the biological structures in nature. The biological surfaces in the plant and the animal kingdoms can provide efficient and energy-saving geometric designs. Being in constant contact with water, the aquatic lives have, by trial and error, exploited the principle of growing surfaces with structures in countless instances, such as fibrils, scales, ridges, gill rakers, hairs, gratings, or spikes with dimensions ranging from millimeters down to several nanometers.

Figure 6A:
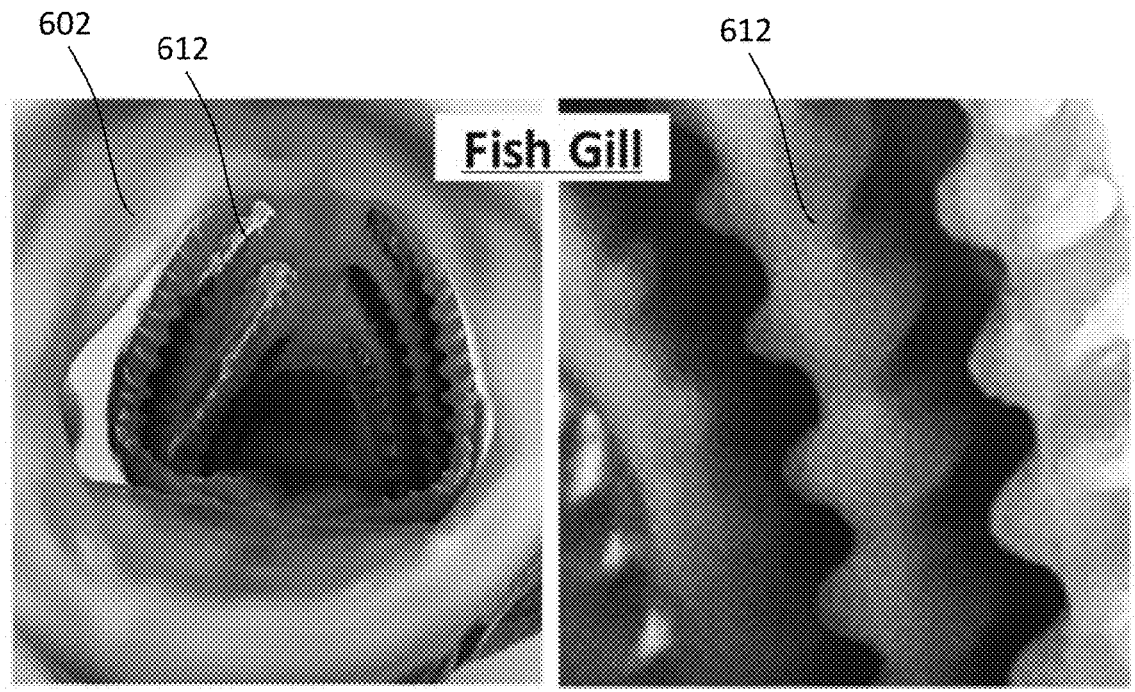
FIGS. 6A and 6B illustrate exemplary fabrication of bio-mimicked structures on membrane surface via printing-on-membrane.
Figure 6B:
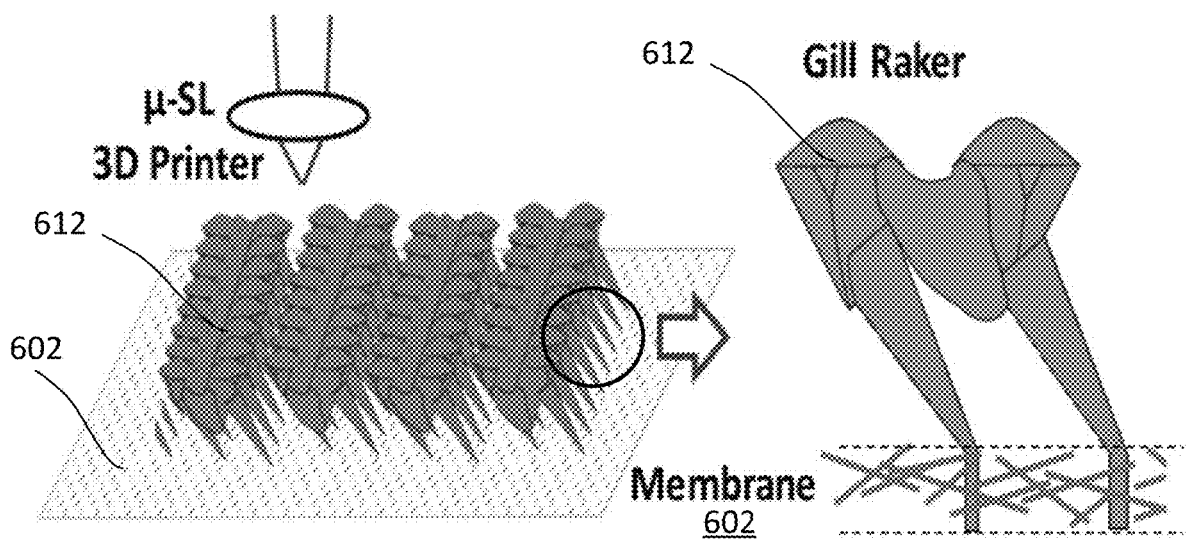

FIGS. 6A-6B illustrate a bio-inspired membrane 602. For example, the membrane 602 can be or include fish gill-shaped structures 612 positioned on a surface of the membrane 602. As an example of creating bio-mimicked membrane filter, fish gill-shaped structures 612 can be directly printed on the membrane 602 with micro-meter printing resolution. In FIG. 6A, the optical images shows the fish gill microstructures, and FIG. 6B illustrates 3D-printing of these gill-shaped structures 612 on the membrane 602 via printing-on-membrane method.

Figure 7A:
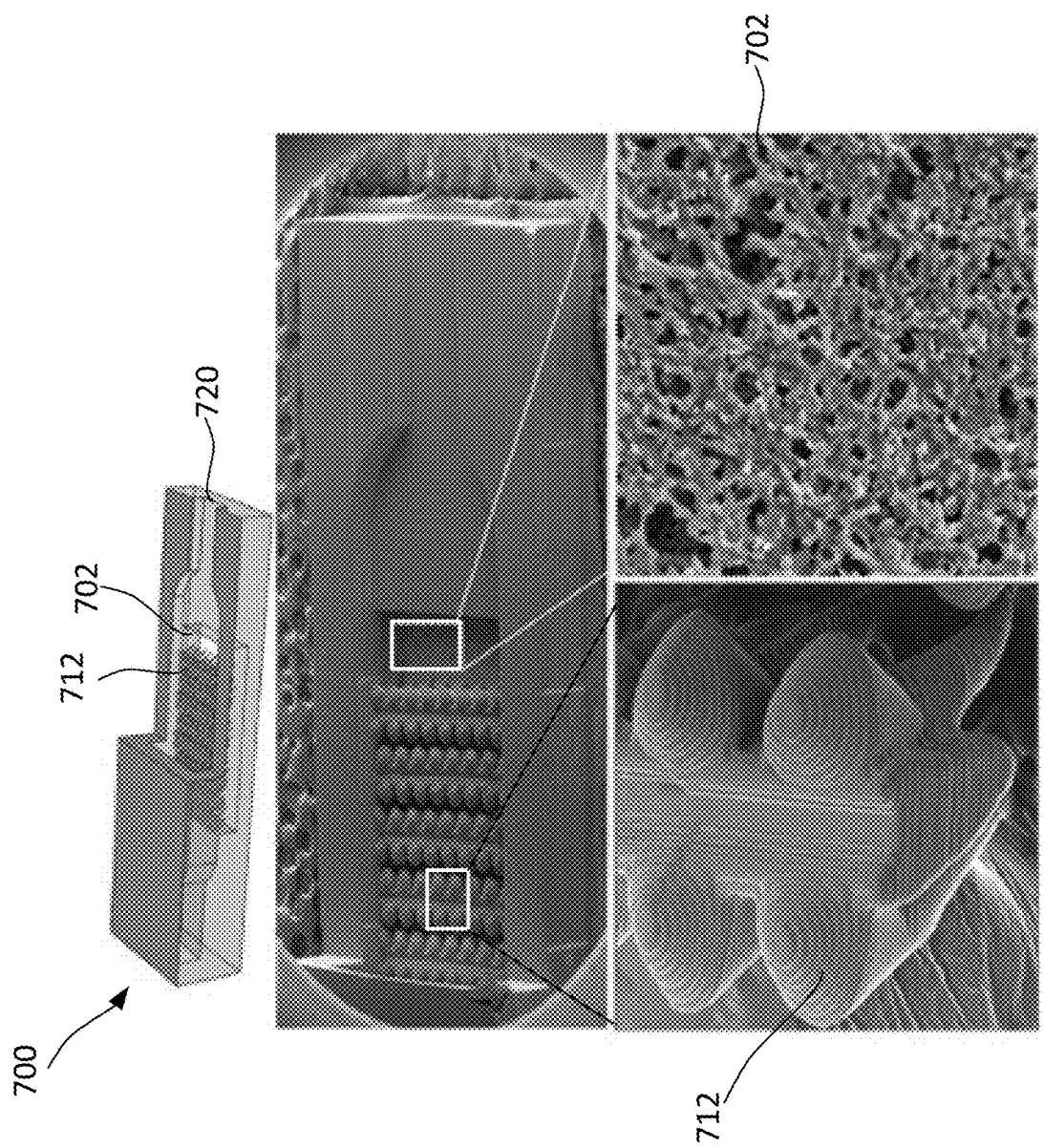
FIGS. 7A, 7B, and 7C illustrate an exemplary membrane microfluidic device with bio-mimicked structures.
Figure 7B:
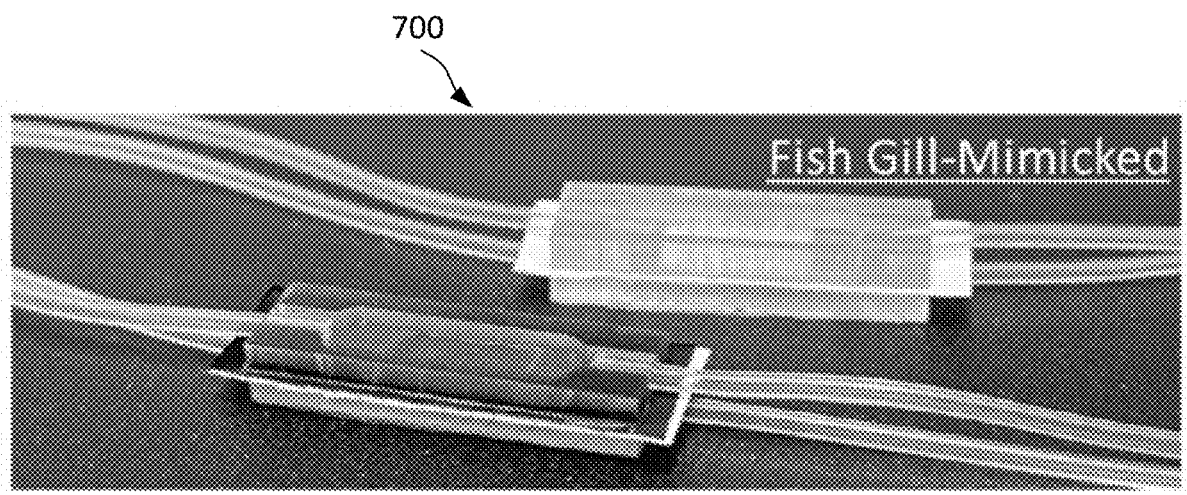
Figure 7C:
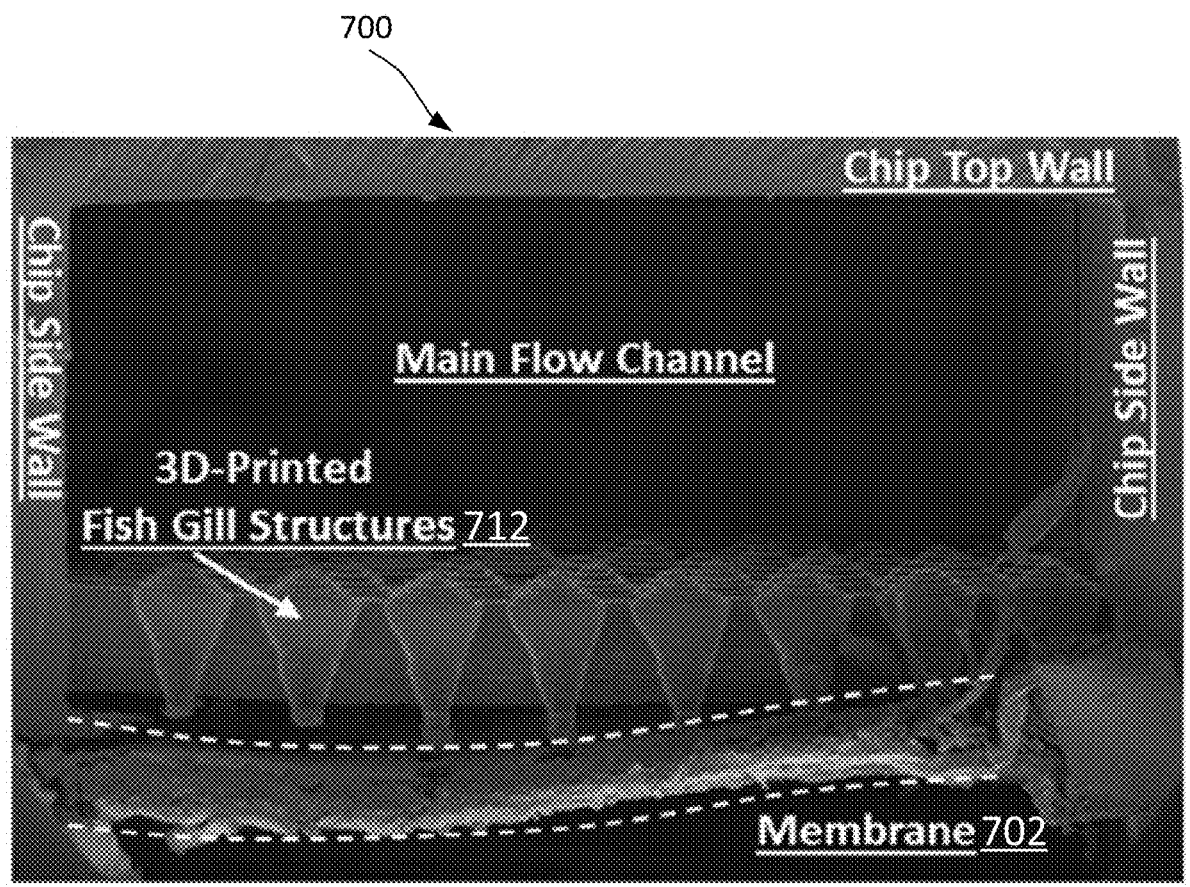

In various embodiments, a printing-on-membrane approach can be used to create an on-chip platform to characterize the filtration performance of 3D-structured membranes. The printing-on-membrane technique is able to integrate different functional parts, including a membrane, gill-shaped structures, and chip frames, into an all-in-one microfluidic device. FIG. 7A illustrates an example of a bio-mimicked membrane microfluidic chip 700. The microfluidic chip 700 can integrate all the functional components directly via 3D printing the fish gill structures 712, an inlet opening 720, an outlet opening (not shown), and walls embedded with porous membrane 702. FIG. 7A shows images of a half-printed chip that are captured under scanning electron microscope (SEM). The internal structures, including the fish gill microstructures 712 and the underneath membrane 702, are also presented with the magnified images. The as-printed microfluidic devices 700 are shown in FIG. 7B, with a cross-section view of the internal structures in FIG. 7C.

Figure 8A:
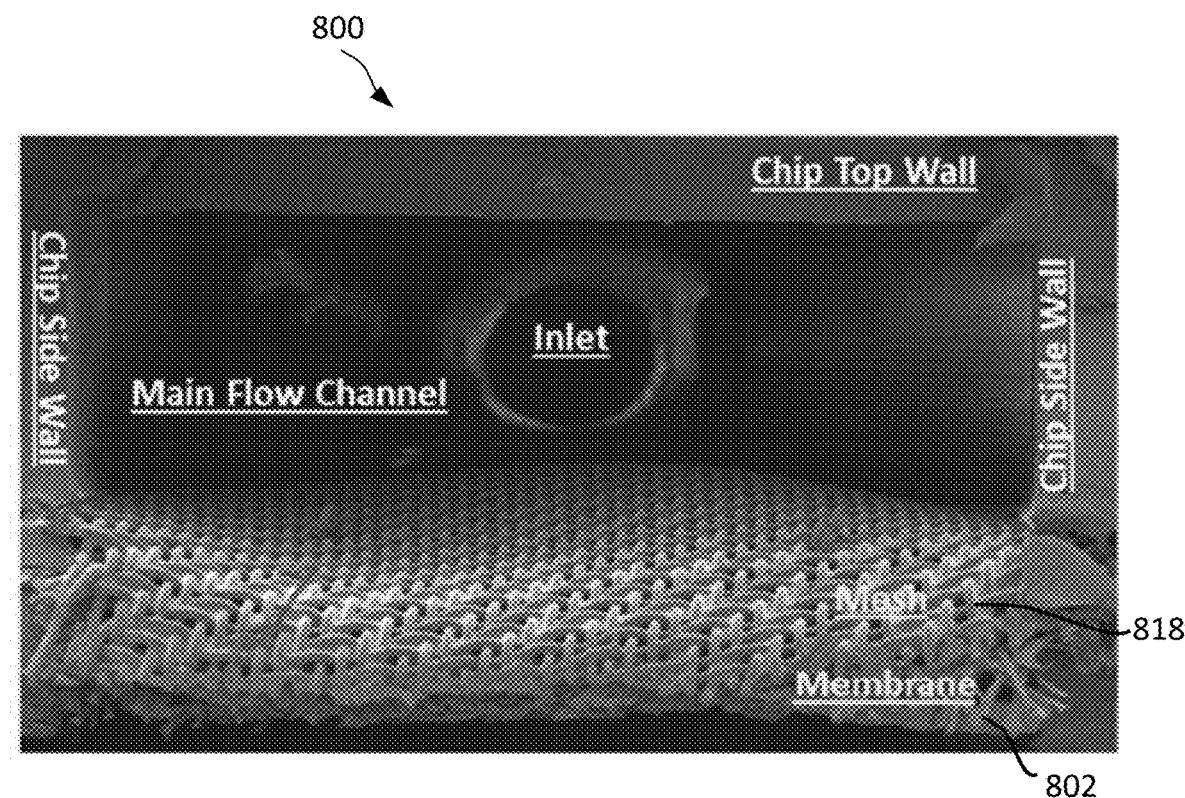
FIGS. 8A and 8B illustrate an exemplary multi-material membrane device by bonding metallic mesh with polymeric membrane.
Figure 8B:
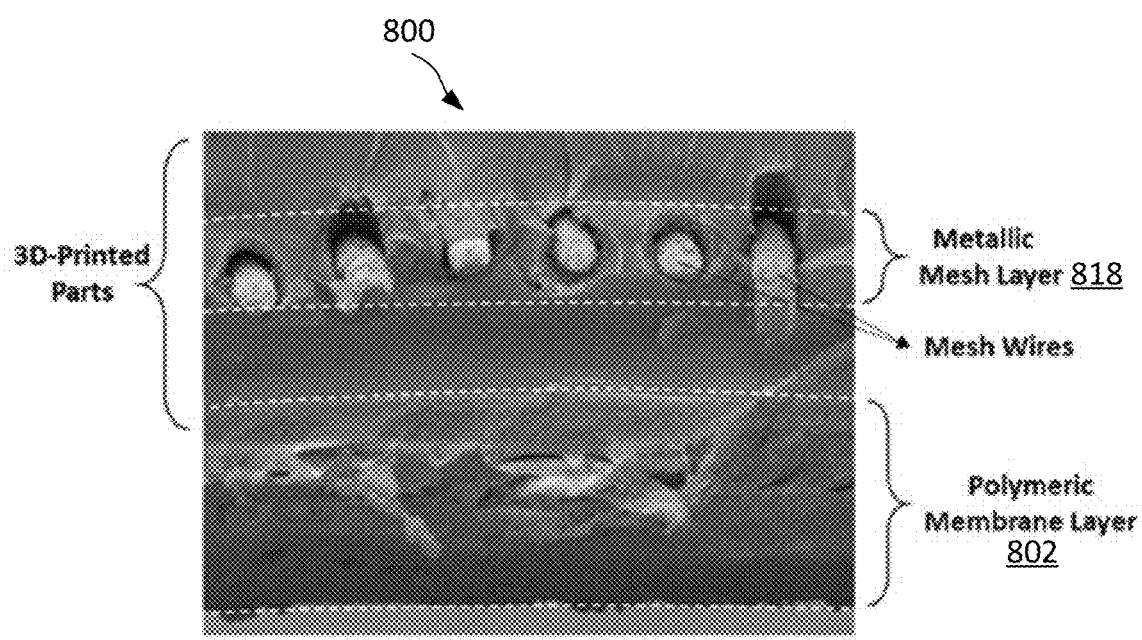

With printing-on-membrane method, new micro-structures on membrane can be created and also combined with other existing materials/structures to form a multilayered hybrid membrane. For example, FIGS. 8A-8B illustrate a two-layer filtration membrane device 800 containing a metallic micro-mesh 818 and polymeric membrane 802. The fabrication method is similar to the one in FIG. 1. After embedding the membrane 802 in the printed layer in Step 2, the metallic micro-mesh 818, such as an oxidized copper mesh, can then be inserted for the printing of the next layer. The vertical distance between the mesh 818 and the membrane 802 can be accurately controlled by printed layer thickness or layer numbers between them. From the cross-section view in FIG. 8B, it is clearly seen that the metallic micro-mesh 818 is incorporated with the polymeric membrane 802, demonstrating the capability of 3D printing-on-membrane method in integrating multi-materials in one device.

Figure 9A:
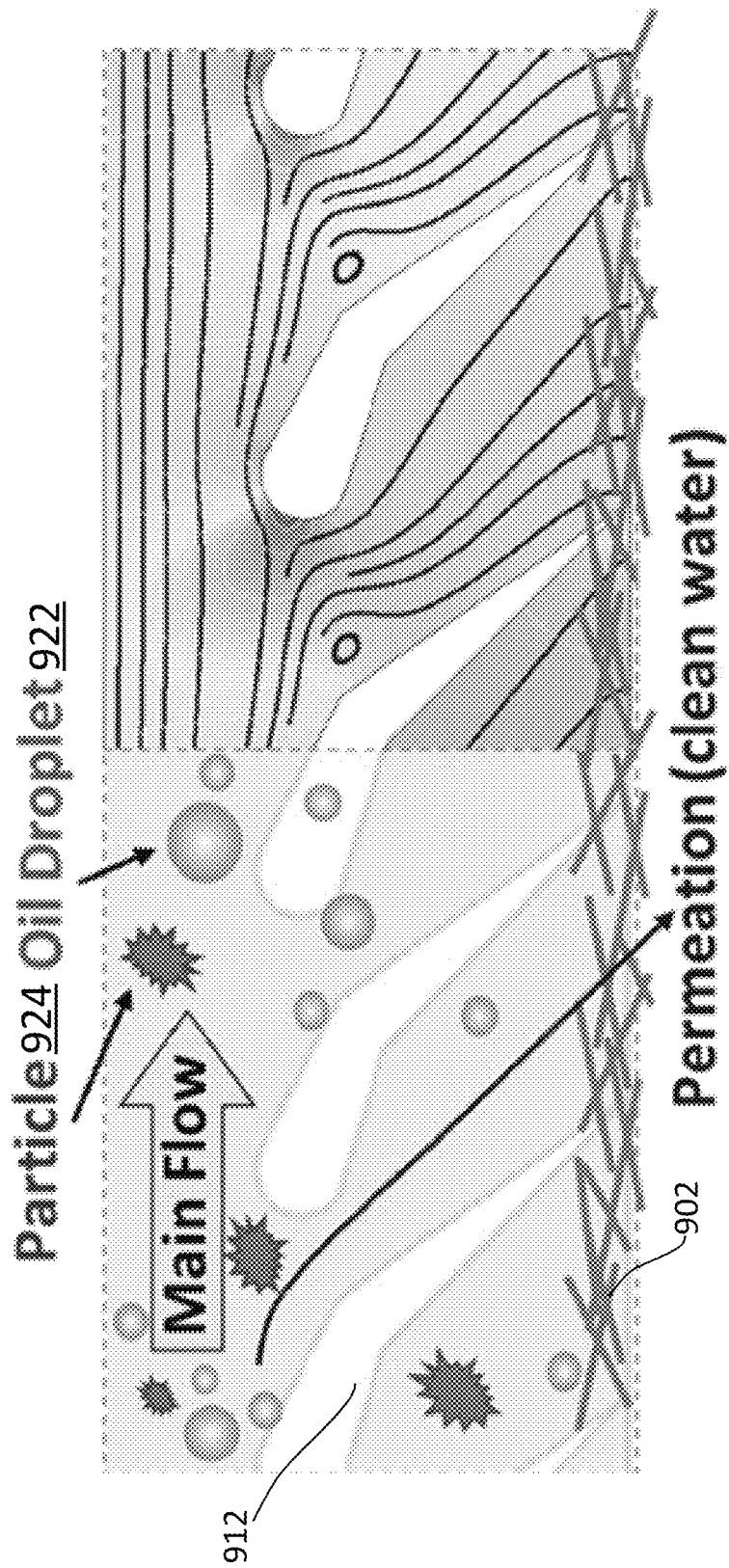
FIGS. 9A, 9B, and 9C illustrate an exemplary membrane surface structure-fluid interaction and ultimately anti-clogging/fouling functionality is demonstrated with a bio-mimicked membrane with 3D-printed fish gill structures.
Figure 9B:
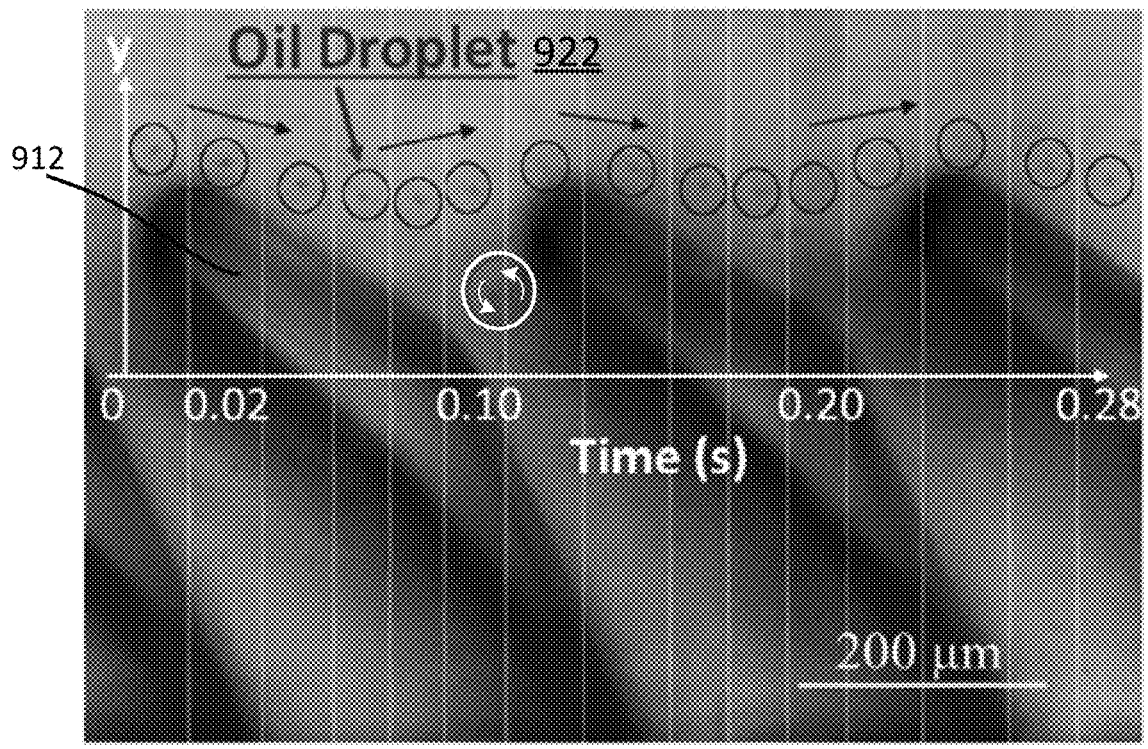
Figure 9C:
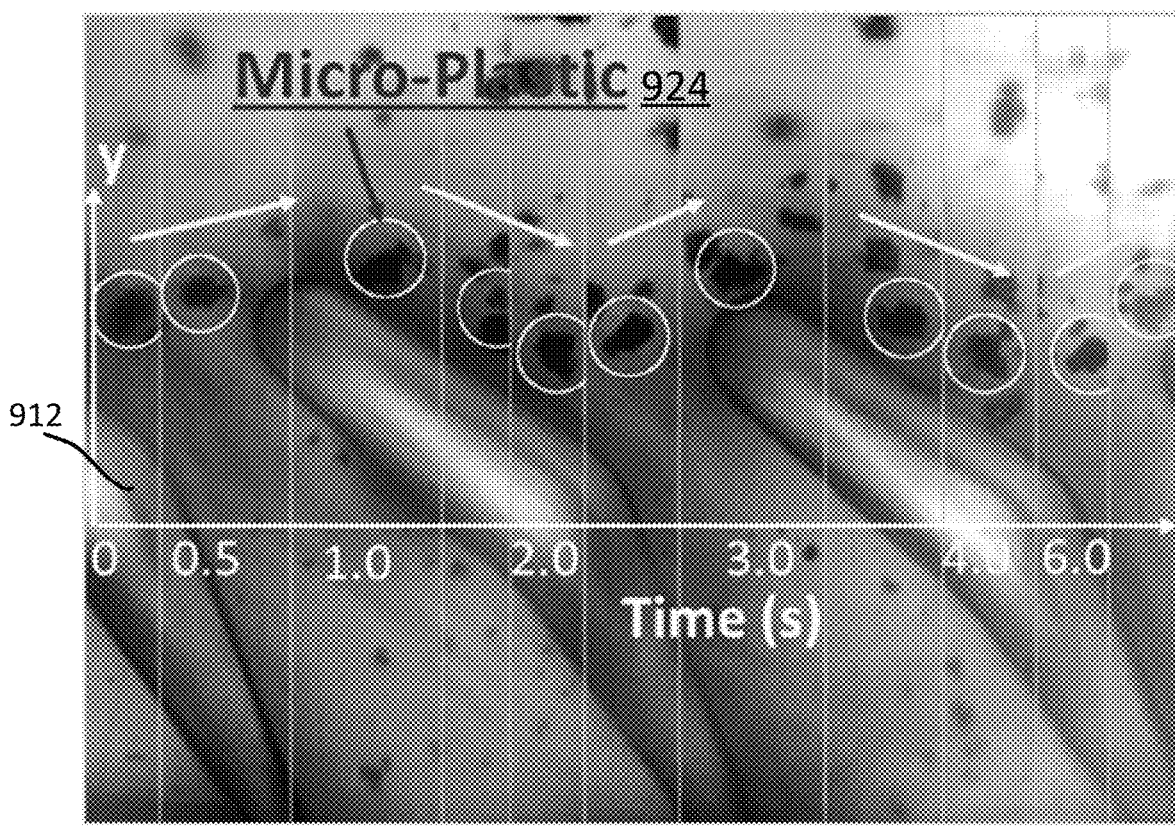

3D-printed structures on a membrane surface can induce significant changes on flow patterns near the membrane surface, which can affect membrane-foulant (i.e. polymer particles or oil droplets) interactions and ultimately anti-fouling/clogging performance. FIG. 9A illustrates a cross-flow filtration process, FIG. 9B illustrates flow trajectories of an oil droplet 922 in emulsion separation, and FIG. 9C illustrates plastic micro-particles 924 in wastewater filtration under an optical microscope, which reveal the hydrodynamic anti-fouling/clogging mechanism. The mainstream of wastewater (oily water, or wastewater containing microplastic) flows above the fish gill-shaped microstructures 912 while permeate (clean water) enters the gaps and penetrates through the membrane 902. The streamline and pressure field are presented from the numerical simulation results. Vortices between the gaps of gill elements can be found from the simulated streamlines. These vortices, along with the local pressure gradient at the tip of each gill element, can potentially change the droplet/particle behavior when passing very near it.

As an illustrative example, FIGS. 9B and 9C show the trajectory of the oil droplet 922 and the plastic micro-particle 924 passing above the gill-shaped structures 912, respectively. From their trajectories, it can be determined that the size of the oil droplet 922 is much smaller than the gaps between two neighboring gill elements, so the oil droplet 922 does not enter the gap but retains in the main flow. Also from the droplet trajectory in FIG. 9B, it can be determined that as the oil droplet 922 approaches a gill element of the gill-shaped structures 912, the permeate flow leads the oil droplet 922 to enter the gap (see t=0.02 to 0.08 s in FIG. 9B). However, the oil droplet 922 may be diverted away from the gap due to the vortices (see t=0.10 s) and encounter the leading edge of the next gill element, where the local pressure gradient further causes the oil droplet 922 to "ricochet" away from the gap and back into the main flow (t=0.10 to 0.12 s). This process can repeat at the next gill elements (t=0.14 to 0.24 s) and cause the oil droplets to be repeatedly excluded from the permeate. This process can also be followed by the micro-particle 924, as illustrated in FIG. 9C. Such ricochet can result from the printing of the bio-mimicked fish gill structures 912 on the membrane 902, adopting the mechanism of aquatic animals like Manta rays filtering plankton and other food particles out of the water. Even with the mesh-bonded membrane, the mesh wires can play the same role. The same ricochet behavior can be observed near circular structures, representing the cross-section of mesh wire.

Figure 10B:
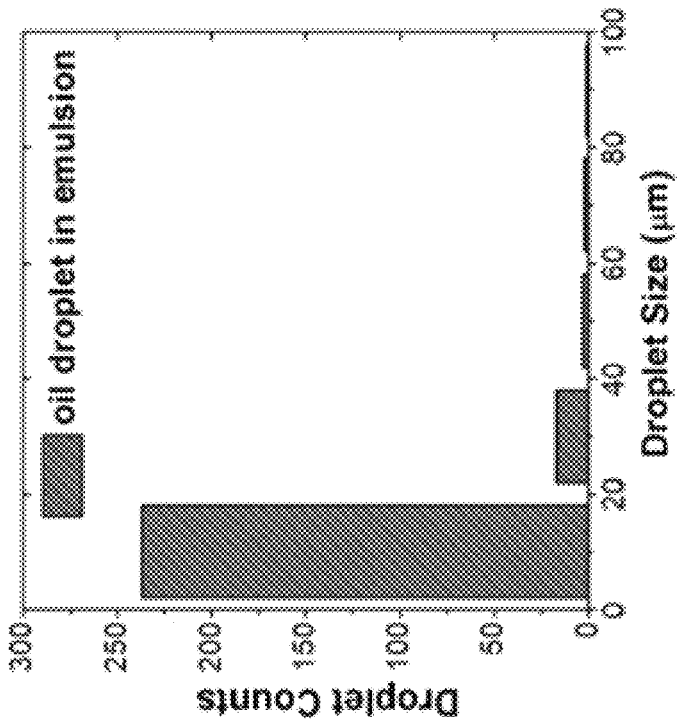
FIGS. 10A, 10B, 10C, and 10D illustrate a case study of high-flux anti-fouling performance of 3D-structured membrane in treating oily wastewater.
Figure 10A:
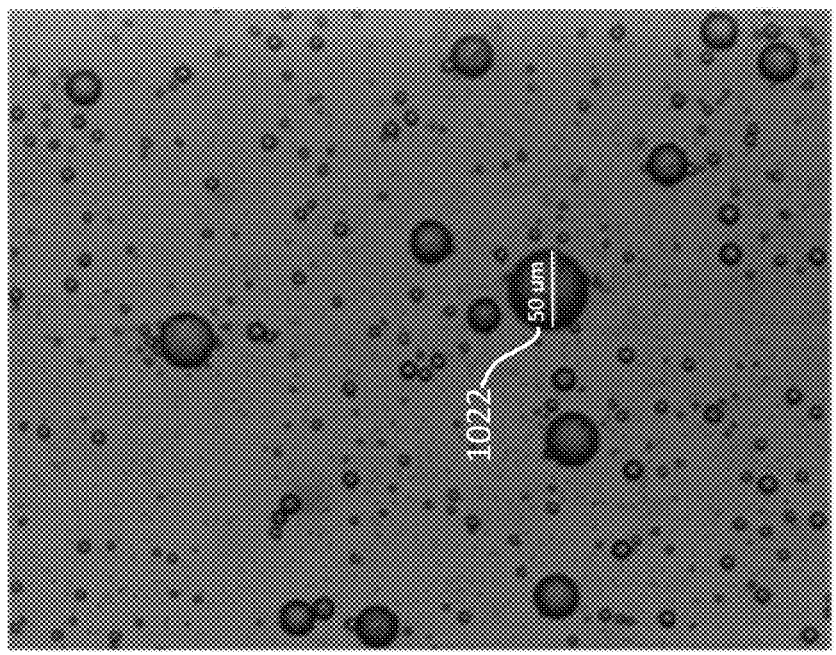
Figure 10C:
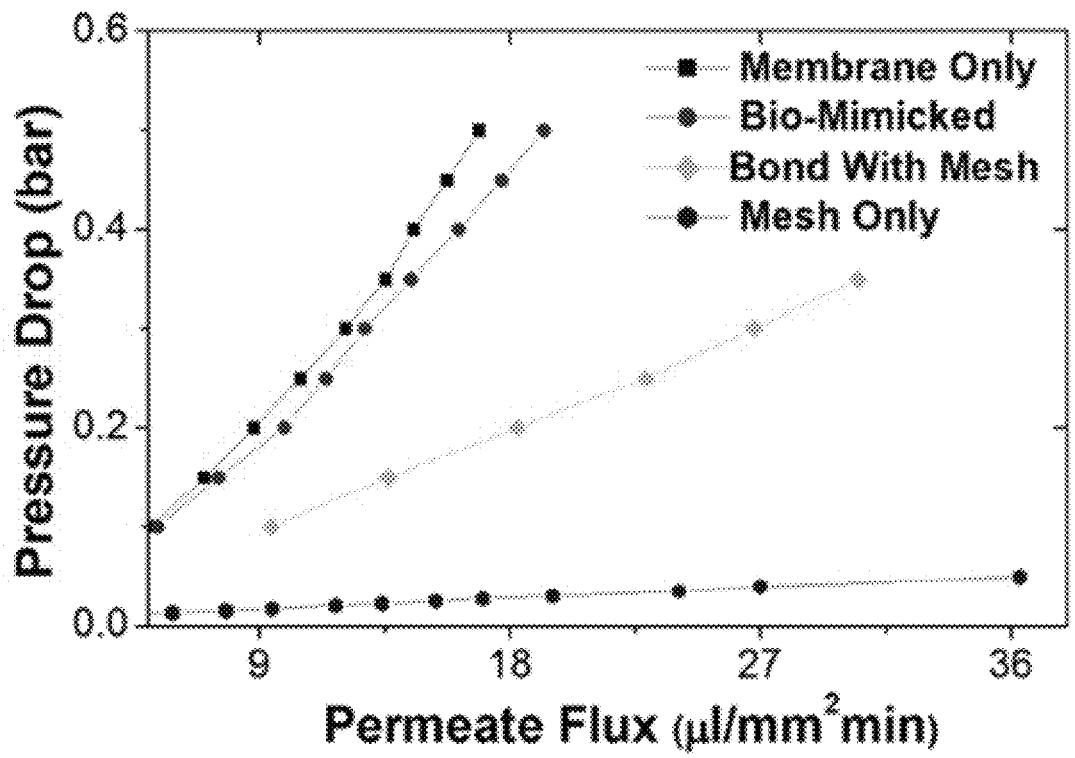
Figure 10D:
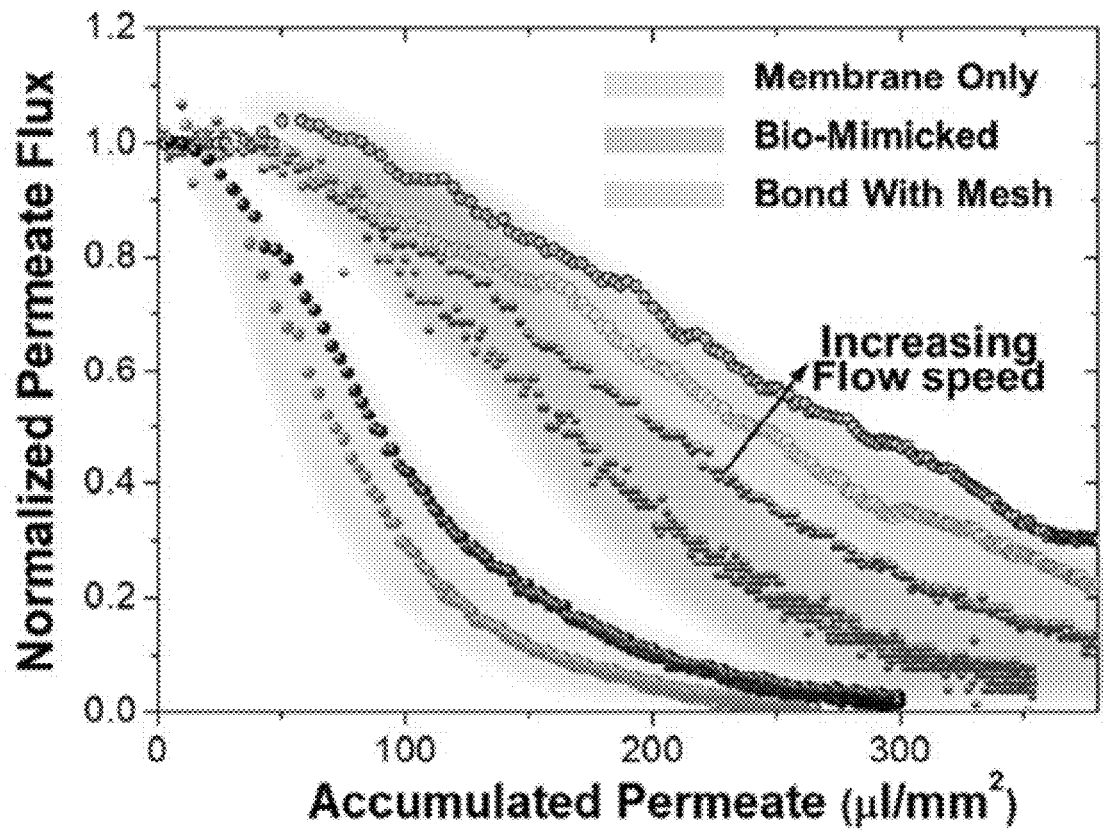

The filtration performance of surface-structured hybrid membranes can be evaluated based on various parameters during oily water treatment (e.g., surfactant-stabilized emulsion separation). The morphology of oil droplets 1022 in the used emulsion and their size distribution are shown in FIGS. 10A and 10B. The majority of oil droplets 1022 (>90%) are below 20 μm. To have a comprehensive comparison, the filtration performance of four different membrane configurations can be compared. The membrane configurations include a conventional membrane, a mesh-only membrane, 3D-structured membrane with bio-mimicked structures, and a hybrid multilayer membrane with metallic mesh. FIGS. 10C and 10D show the permeability and filtration durability, respectively. The mesh-only configuration has the best permeability with almost negligible pressure drop, while the membrane-only one has the largest flow resistance. After printing of fish gill-shaped structures or bonding of an extra mesh layer on membrane, the total flow resistance of these structured membranes does not increase, and their permeabilities have been increased. Meanwhile, the 3D-structured membranes have the best anti-fouling/clogging performance, maintaining a higher permeate flux with a longer filtration time than the membrane-only one. After testing various inlet pressures during emulsion injection, the durability can be further prolonged with the increased main flow velocity (see FIG. 10D).

Figure 11:
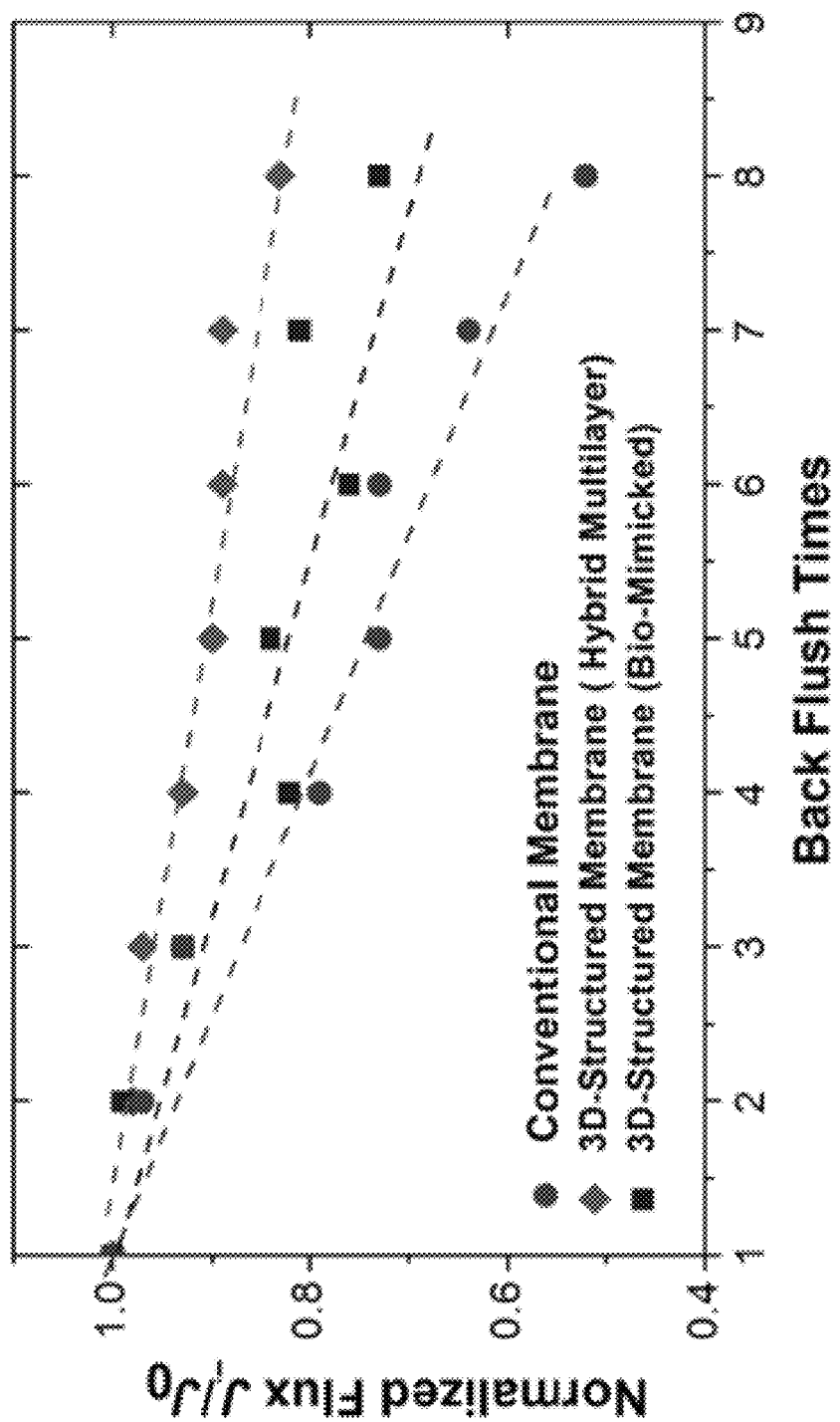
FIG. 11 illustrates an industrial application of 3D-structured membrane as showcased by oily wastewater treatment with backflush.

In a further illustrative example, the 3D-structured hybrid membrane for the real application with backflush cleaning can be examined. Though most membrane applications involve cross-flow modules, dead-end filtration is considered as a "worst case scenario" for investigating membrane fouling. Therefore, the membrane fouling can be characterized in separating the surfactant-stabilized emulsions with a dead-end scenario and followed with backflush. FIG. 11 presents time-dependent declines of permeate flux of the multilayered mesh/membrane configuration. The initial permeate flux of a virgin membrane is marked as $J_0$ and the initial permeate flux of each cycle is $J_i$. In FIG. 11, the normalized initial permeate flux $J_i/J_0$ and duration time can be compared among the different aforementioned membrane configurations. Overall, the normalized flux declined with the increase of filtration cycles for all the configurations because of the hydraulic-irreversible fouling accumulated on membrane surface. Meanwhile, different configurations suffered different extent of flux decline after backflush. A more remarkable flux decline can occur with the membrane-only configuration, which means higher membrane fouling potential when there are no microstructures on membrane surface. The multilayer mesh/membrane remains the best anti-fouling performance after each backflush.

Figure 12:
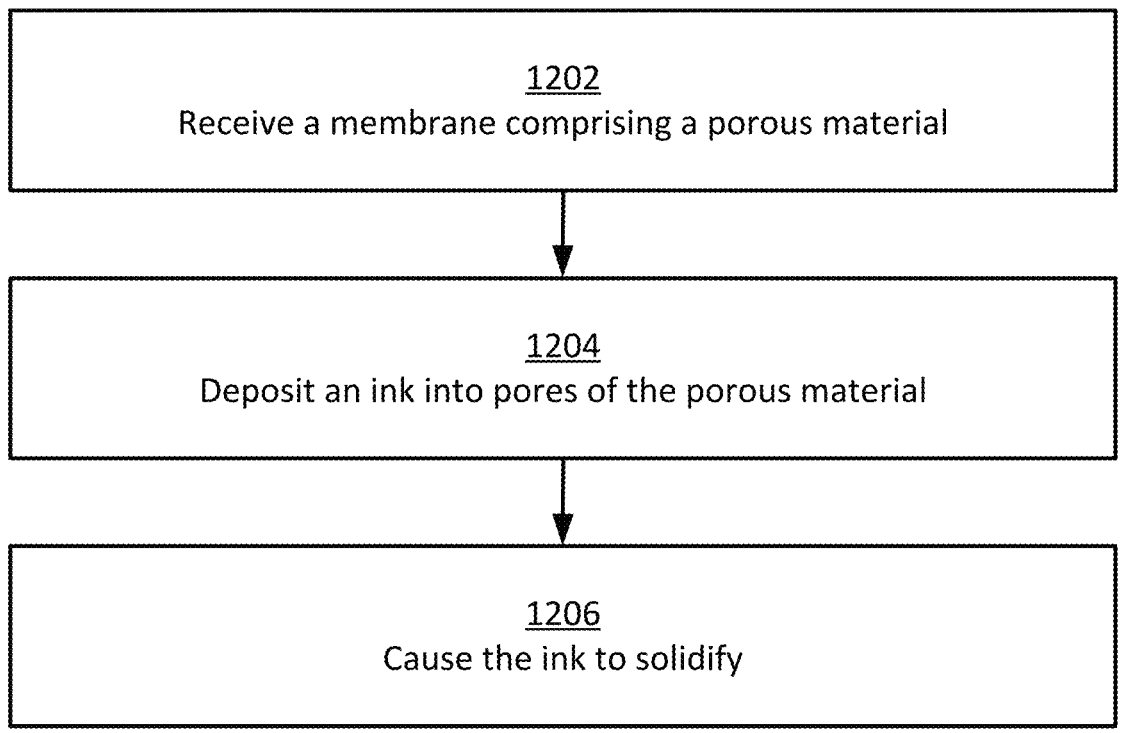
FIG. 12 illustrates an example of a flowchart for a process generating a 3D-structured membrane filter.

FIG. 12 illustrates an example of a flowchart for a process generating a 3D-structured membrane filter. At block 1202, a membrane is received. The membrane can be a porous material. In some embodiments, the membrane may be a commercially-available membrane with pore sizes ~200. The membrane may be a polymeric material, a metallic material, or a ceramic material.

At block 1204, ink is deposited into pores of the membrane. For instance, the membrane can be submerged in the ink, which can allow some or all of the pores of the membrane to be filled with the ink. The ink can be a polymer material, a hydrogel material, a ceramic material, or a photo-curable material.

At block 1206, the ink is caused to solidify. Solidifying the ink causes the ink to bond with the membrane and form a 3D structure having multiple layers. A UV light can be shown on the ink to cure portions of the ink. Uncured ink can then be washed away with a solvent bath, while the solidified structures are kept on the membrane, forming the 3D structure. The solidified structures can be a spacer. The 3D structure may be any suitable structure, such as a Primitive or Gyroid lattice structure, a bio-mimicked structure, or a microfluidic chip.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

REFERENCES

The following references describe some background in this technology.

1. A. R. Da Costa, A. G. Fane, D. E. Wiley, Spacer characterization and pressure drop modelling in spacer-filled channels for ultrafiltration, J. Memb. Sci., 87 (1) (1994).
2. Y. C. Woo, Y. Kim, M. Yao, L. D. Tijing, J.-S. Choi, S. Lee, S.-H. Kim, H. K. Shon, Hierarchical composite membranes with robust omniphobic surface using layer-by-layer assembly technique, Environ. Sci. Technol., 52 (4) (2018).
3. M. Yao, J. Ren, N. Akther, Y. C. Woo, L. D. Tijing, S.-H. Kim, H. K. Shon, Improving membrane distillation performance: morphology optimization of hollow fiber membranes with selected non-solvent in dope solution, Chemosphere, 230 (2019).
4. L. D. Tijing, J.-S. Choi, S. Lee, S.-H. Kim, H. K. Shon, Recent progress of membrane distillation using electrospun nanofibrous membrane, J. Memb. Sci., 453 (2014).
5. Y. Z. Tan, Z. Mao, Y. Zhang, W. S. Tan, T. H. Chong, B. Wu, J. W. Chew, Enhancing fouling mitigation of submerged flat-sheet membranes by vibrating 3D-spacers, Sep. Purif. Technol., 215 (2019).
6. J.-Y. Lee, W. S. Tan, J. An, C. K. Chua, C. Y. Tang, A. G. Fane, T. H. Chong, The potential to enhance membrane module design with 3D printing technology, J. Memb. Sci., 499 (2016).
7. N. Yanar, M. Son, H. Park, H. Choi, Toward greener membranes with 3D printing technology, Environmental Engineering Research, 26(2) (2021).

What is claimed is:

1. A method for forming a membrane filtration device, the method comprising:
   receiving a membrane comprising a first porous material comprising pores, wherein the membrane comprises a polymeric material, a metallic material, or a ceramic material;
   depositing a first ink in a liquid state into the pores of the first porous material;
   causing the first ink to solidify, wherein solidifying the first ink causes the first ink to bond with the membrane and form a three-dimensional structure extending from the membrane via layer-by-layer three-dimensional printing;
   receiving a second porous material that is different than the first porous material between the membrane and the three-dimensional structure;
   depositing a second ink into the second porous material; and
   causing the second ink to solidify to form the membrane filtration device by forming additional layers on top of the membrane.

2. The method of claim 1, wherein causing the first ink to solidify comprises curing the first ink using light.

3. The method of claim 1, wherein causing the first ink to solidify comprises causing the first ink to form functional structures on a surface of the membrane via micro-stereolithographic three-dimensional printing.

4. The method of claim 3, wherein the functional structures comprise three-dimensionally printed lattice structures or three-dimensionally printed bio-mimicked structures.

5. The method of claim 1, wherein the membrane has a first geometric shape and the three-dimensional structure has a second geometric shape.

6. The method of claim 1, wherein the first ink comprises a photo-curable material and a composite material.

7. The method of claim 6, wherein the composite material comprises a polymeric resin, a hydrogel, or a ceramic nanoparticle ink composite.

8. A method of generating a membrane filtration device comprising:
   receiving a membrane comprising a first porous material comprising pores, wherein the membrane comprises a polymeric material, a metallic material, or a ceramic material;
   depositing a first ink into the pores of the first porous material;
   causing the first ink to solidify, wherein solidifying the first ink causes the first ink to bond with the membrane and form three-dimensional printed structures extending from the membrane;
   inserting a mesh between the three-dimensional printed structures;
   receiving a second porous material that is different than the first porous material between the membrane and the three-dimensional structure;
   depositing a second ink into the second porous material; and
   causing the second ink to solidify to form a filtration device by forming additional layers on top of the membrane.

9. The method of claim 8, wherein causing the first ink to solidify comprises curing the first ink using light.

10. The method of claim 8, wherein causing the first ink to solidify comprises causing the first ink to form functional structures on a surface of the membrane via micro-stereolithographic three-dimensional printing.

11. The method of claim 10, wherein the functional structures comprise multiple layers of the membrane, the mesh, and the three-dimensional printed structures.

12. The method of claim 8, wherein the mesh comprises a polymeric material, a metallic material, or a ceramic material.

13. The method of claim 8, wherein the membrane has a first geometric shape and the three-dimensional printed structures have a second geometric shape.

14. The method of claim 8, wherein the first ink comprises a photo-curable material and a composite material.

15. The method of claim 14, wherein the composite material comprises a polymeric resin, a hydrogel, or a ceramic nanoparticle ink composite.

* * * * *